United States Patent
Laroia et al.

(10) Patent No.: US 6,553,019 B1
(45) Date of Patent: Apr. 22, 2003

(54) COMMUNICATIONS SYSTEM EMPLOYING ORTHOGONAL FREQUENCY DIVISION MULTIPLEXING BASED SPREAD SPRECTRUM MULTIPLE ACCESS

(75) Inventors: Rajiv Laroia, Basking Ridge, NJ (US); Junyi Li, Matawan, NJ (US); Sathyadev Venkata Uppala, Scotch Plains, NJ (US); Sundeep Rangan, Hoboken, NJ (US)

(73) Assignee: Flarion Technologies, Inc., Bedminster, NJ (US)

( * ) Notice: Subject to any disclaimer, the term of this patent is extended or adjusted under 35 U.S.C. 154(b) by 0 days.

(21) Appl. No.: 09/472,074

(22) Filed: Dec. 23, 1999

(51) Int. Cl.$^7$ .................................................. H04J 1/00
(52) U.S. Cl. ..................... 370/343; 370/206; 370/208; 375/140; 375/142; 375/144
(58) Field of Search ................................. 370/206, 208, 370/343; 375/140, 142, 144

(56) References Cited

U.S. PATENT DOCUMENTS

| | | | |
|---|---|---|---|
| 4,435,821 A | | 3/1984 | Ito et al. |
| 5,548,582 A | | 8/1996 | Brajal et al. |
| 5,914,933 A | * | 6/1999 | Cimini et al. ................ 370/208 |
| 6,031,827 A | * | 2/2000 | Rikkinen et al. ............ 370/330 |
| 6,112,094 A | * | 8/2000 | Dent .......................... 375/132 |
| 6,320,897 B1 | * | 11/2001 | Fattouche et al. ........... 375/130 |

OTHER PUBLICATIONS

G. J. Pottie et al., "Channel Coding Strategies for Cellular Radio", *IEEE Transactions On Vehicular Technology*, vol. 44, No. 4, pp. 763–770, Nov. 1995.

* cited by examiner

Primary Examiner—Thanh Cong Le
Assistant Examiner—Alan T. Gantt
(74) Attorney, Agent, or Firm—Straub & Pokotylo; Michael P. Straub

(57) ABSTRACT

Tone sequences in a frequency hopping arrangement are generated and assigned by advantageously employing a combination of a sequence generator and a sequence assignor to generate sequences and assign them on a time slot by time slot basis. In a transmitter, the sequence generator and sequence assignor, in combination with a user tone assignor are employed to generate and assign tone sequences to a user on a time slot by time slot basis. In a receiver, the sequence generator and sequence assignor, in combination with a user tone identifier are employed to generate sequences and to identify incoming tone sequences to a user on a time slot by time slot basis. Specifically, the sequence assignment in a time slot is such that a prescribed plurality of sequences is assigned to a particular user. This partitioning of the tasks facilitates the use of a sequence generator that generates sequences with the desirable properties of interference and frequency diversity and, which, leaves the task of properly assigning these sequences among one or more users to the sequence assignor. The sequence assignor functions in such a manner that the interference and frequency diversity properties for the one or more users are preserved, and this is further facilitated by assigning sequences in such a manner that they maximally overlap prior assigned sequences. In one embodiment of the invention, a Latin square based sequence is generated in accordance with a first prescribed process. In a second embodiment of the invention, a Latin cube based sequence is generated in accordance with a second prescribed process. In a third embodiment of the invention, a Latin hypercube of prescribed dimension based sequence is generated in accordance with a third prescribed process. In still another embodiment of the invention, the principles of the invention are employed to realize frequency band hopping.

44 Claims, 5 Drawing Sheets

COMMUNICATIONS SYSTEM EMPLOYING ORTHOGONAL FREQUENCY DIVISION MULTIPLEXING BASED SPREAD SPRECTRUM MULTIPLE ACCESS

RELATED APPLICATION

U.S. patent application Ser. No. 09/267,471 was filed on Mar. 11, 1999.

TECHNICAL FIELD

This invention relates to communications systems and, more particularly, to wireless and other communications systems employing Orthogonal Frequency Division Multiplexing based Spread Spectrum Multiple Access.

BACKGROUND OF THE INVENTION

It is important that wireless communications systems be as efficient as possible in order to maximize the number of users that can be adequately served and to maximize data transmission rates, if data services are provided. Wireless communications systems are typically shared media systems, i.e., there is a fixed available bandwidth that is shared by all users of the wireless system. Such wireless communications systems are often implemented as so-called "cellular" communications systems, in which the territory being covered is divided into separate cells, and each cell is served by a base station.

It is well known in the art that desirable features of cellular wireless communications systems are that intracell interference be as small as possible and that intercell interference be averaged across all users in adjacent cells.

One prior known system of interest is disclosed in U.S. Pat. No. 5,548,582 issued on Aug. 20, 1996 to Brajal et al. The Brajal et al. arrangement is a general wide-band orthogonal frequency division multiplexing (OFDM) based spread spectrum multiple access employed in a wireless communications systems. However, the Brajal et al. arrangement is not optimized for use in a cellular communications system, and fails to show, teach or suggest how to optimize frequency hopping patterns, tone assignment or bandwidth reuse.

More recently, attempts have been made at overcoming the problems and limitations of arrangements like the one disclosed in Brajal et al. One such attempt is disclosed in U.S. patent application of Laroia et al. Ser. No. 09/267,471, filed on Mar. 11, 1999, and assigned to the assignee of the instant United States Patent Application. Although the wireless cellular communications system disclosed in the Laroia et al. application operates satisfactorily in many applications, it is limited in that it is directed toward using a specific frequency hopping sequence. Consequently, interference may not be minimized, and in data communications applications quality of service is not optimized.

SUMMARY OF THE INVENTION

Problems and limitations of prior known frequency hopping arrangements are overcome by advantageously employing a unique combination of a sequence generator and a sequence assignor to generate sequences and assign them on a time slot by time slot basis. In a transmitter, the sequence generator and sequence assignor, in combination with a user tone assignor are employed to generate and assign tone sequences to a user on a time slot by time slot basis. In a receiver, the sequence generator and sequence assignor, in combination with a user tone identifier are employed to generate sequences and to identify incoming tone sequences to a user on a time slot by time slot basis in accordance with sequences assigned by the sequence assignor.

Specifically, the sequence assignment in a time slot is such that a prescribed plurality of sequences is assigned to a particular user. This partitioning of the tasks facilitates the use of a sequence generator that generates sequences with the desirable properties of interference and frequency diversity and, which, leaves the task of properly assigning these sequences among one or more users to the sequence assignor. The sequence assignor functions in such a manner that the interference and frequency diversity properties for the one or more users are preserved, and this is further facilitated by assigning sequences in such a manner that they maximally overlap prior assigned sequences.

In one embodiment of the invention, a Latin square based sequence is generated in accordance with a first prescribed process.

In a second embodiment of the invention, a Latin cube based sequence is generated in accordance with a second prescribed process.

In a third embodiment of the invention, a Latin hypercube of prescribed dimension based sequence is generated in accordance with a third prescribed process.

In still another embodiment of the invention, the principles of the invention are employed to realize frequency band hopping.

DETAILED DESCRIPTION

Briefly, Orthogonal frequency division multiplexing (OFDM) systems employ orthogonal tones within a prescribed frequency bandwidth to transmit data from a plurality of users at the same time. Specifically, for any particular symbol period T that is available for symbol transmission, and a prescribed bandwidth W, the number of available orthogonal tones N, is WT. The spacing between orthogonal tones is Δ=1/T.

Figure 1:
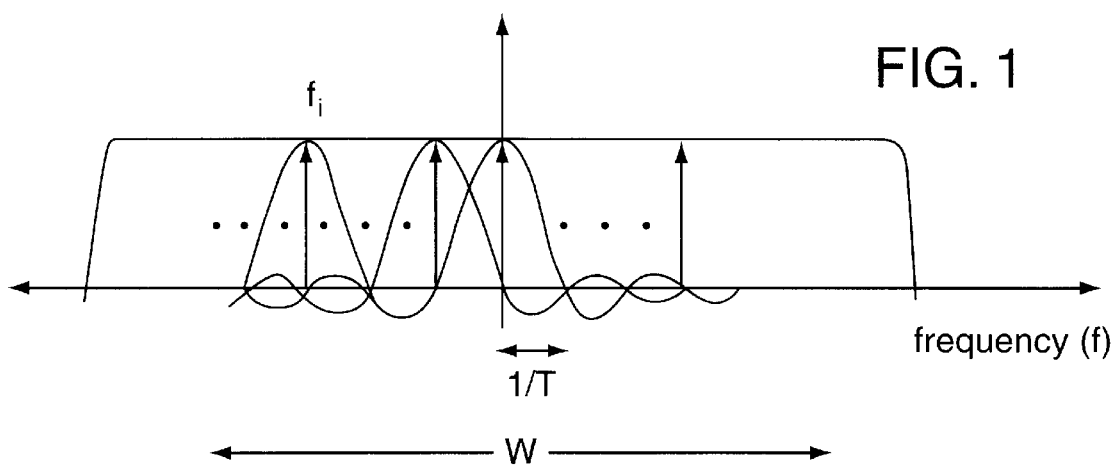
FIG. 1 illustrates a frequency domain representation in which a prescribed plurality of tones is generated in a prescribed bandwidth.

FIG. 1 illustrates a frequency domain representation in which a prescribed plurality of tones is generated in a prescribed bandwidth. In this example, bandwidth W is employed to generate a total of N tones, i.e., i=1, . . . N. The tones are spaced at Δ=1/T apart, where T is the duration of an OFDM symbol. Note that the tones employed in this embodiment of the invention are generated differently than those generated for a narrow band system. Specifically, in a narrow band system the energy from each tone is strictly confined to a narrow bandwidth centered around the tone frequency, whereas in an OFDM system that is a wide band system the energy at a particular tone is allowed to leak into the entire bandwidth W, but it is so arranged that the tones do not interfere with one another.

Figure 2:
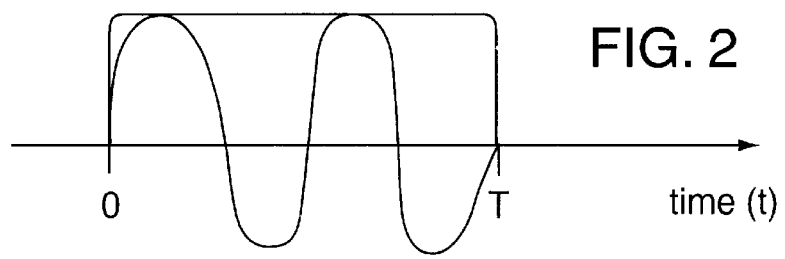
FIG. 2 illustrates a time domain representation of a tone $f_1$.

FIG. 2 illustrates a time domain representation of tone $f_i$ within symbol period T. Again, note that within each symbol period T, data may be transmitted on each of the tones substantially simultaneously.

Figure 3:
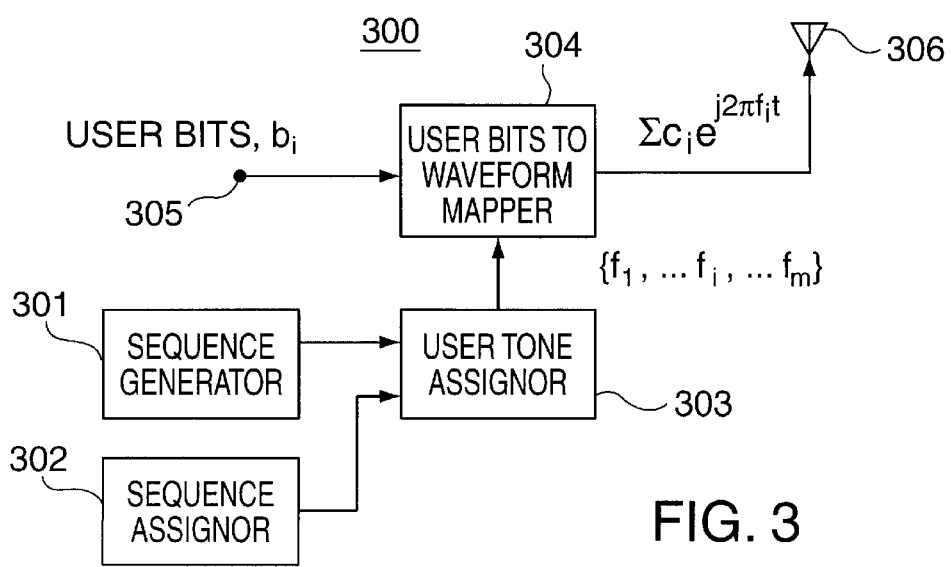
FIG. 3 shows, in simplified block diagram form, details of a transmitter including an embodiment of the invention.

FIG. 3 shows, in simplified block diagram form, details of an OFDM transmitter 300 including an embodiment of the invention. Specifically, shown are sequence generator 301, sequence assignor 302, user tone assignor 303 and user bits to waveform mapper 304. User bits $b_i$ are supplied via input terminal 305 to user bits and waveform mapper 304 where they are mapped using tones $\{f_1, \ldots f_i, \ldots f_m\}$, into a waveform represented by $\Sigma c_i e^{j2\pi\tau_i t}$, which is supplied to antenna 306 for transmission.

Sequence generator 301 generates the frequency hopping sequences. Specifically, the sequence $S_i = \{f_0^{s_i}, f_1^{s_i}, \ldots f_k^{s_i}, \ldots\}$ is generated, in this example, in accordance with one of several processes.

A Latin Square sequence is generated by $f_k^{s_i} = (ak + s_i) \mod p$, where p, a and $s_i$ are integers, p is a prime number or a power of a prime number, k is a dwell time interval index, and the periodicity of the Latin Square sequence is p.

A Latin Cube sequence is generated by $$f_k^{s_i} = \left(a^2 \left\lfloor \frac{k}{p} \right\rfloor + ak + s_i \right) \mod p,$$

where p, a and $s_i$ are integers, p is a prime number or a power of a prime number, $$\left\lfloor \frac{k}{p} \right\rfloor$$

is the largest integer less than $$\frac{k}{p},$$

k is a dwell time interval index, and the periodicity of the Latin Cube sequence is $p^2$.

A Latin Hypercube, for example, of dimension L, is generated by $$f_k^{s_i} = \left( \sum_{l=1}^{L-1} a^2 \left\lfloor \frac{k}{p^{l-1}} \right\rfloor + s_i \right) \mod p,$$

where p, a and $s_i$ are integers, p is a prime number or a power of a prime number, $$\left\lfloor \frac{k}{p^{l-1}} \right\rfloor$$

is the largest integer less than $$\frac{k}{p^{l-1}},$$

k is a dwell time interval index, and the periodicity of the Latin Hypercube sequence is $p^{l-1}$.

The generated sequence $S_i$ is supplied as an input to user tone assignor 303.

Figure 5:
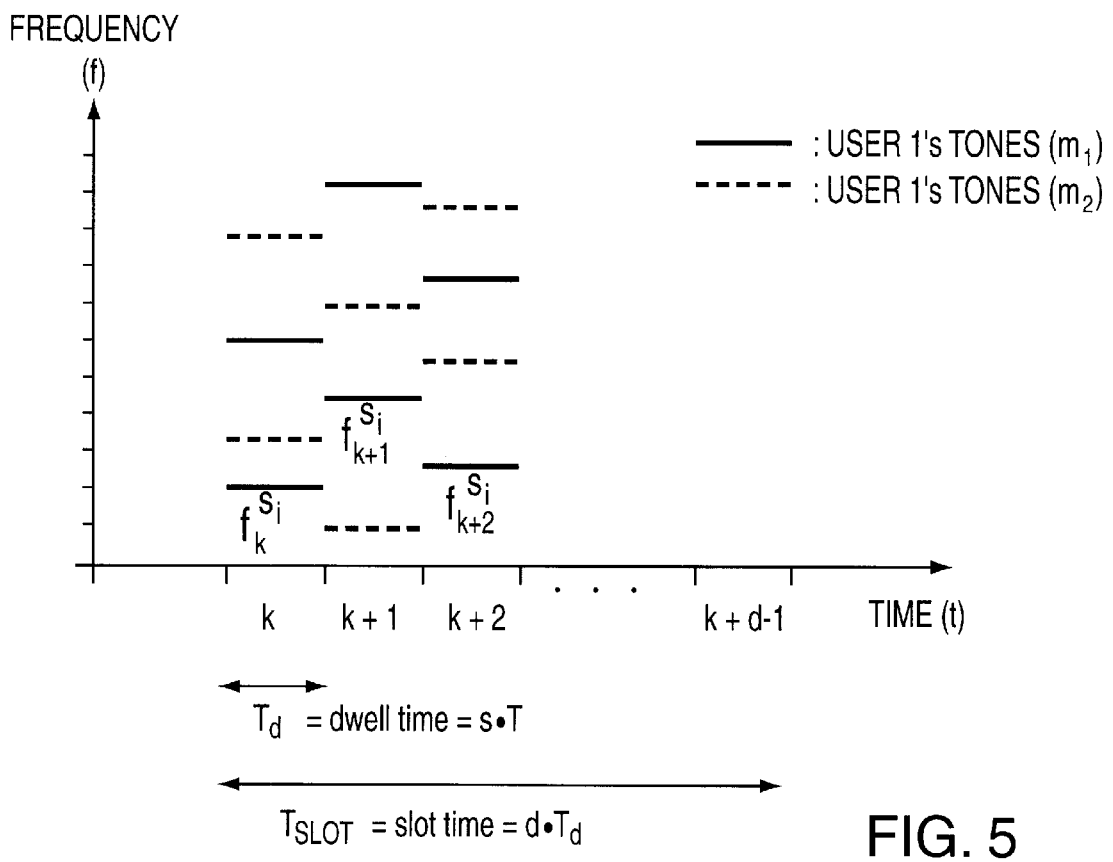
FIG. 5 graphically illustrates the assignment of tone sequences.
Figure 6:
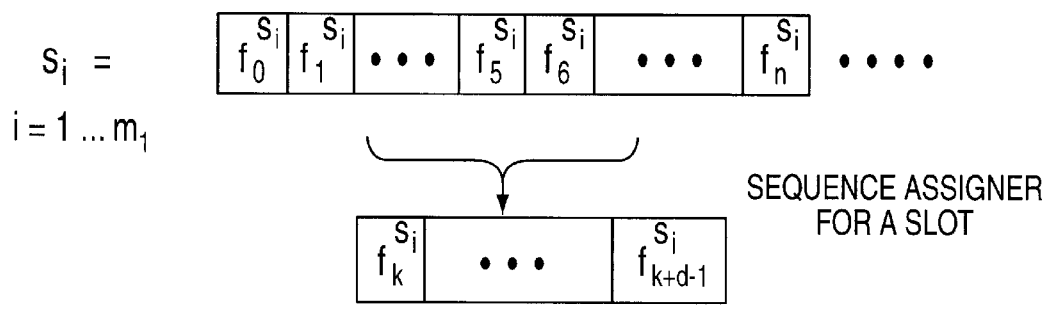
FIG. 6 graphically illustrates the sequence assignment for a time slot.

Sequence assignor 302 assigns sequences to a user for the duration of a time slot, namely, $T_{SLOT}$. Each time slot $T_{SLOT}$ includes d dwell time intervals, each having duration $T_d$, and each dwell interval includes y symbols each of duration T. Thus, $T_d = y \cdot T$ and $T_{SLOT} = d \cdot T_d$. Also note that $T_{SLOT}$ includes dwell time interval k through k+d−1, where k is the dwell time interval index. Each dwell time interval could include one or more prescribed tones. Further, note that the tones of different users do not collide in a cell. This is clearly illustrated in FIG. 5, which graphically illustrates the assignment of tone sequences and in FIG. 6, which graphically illustrates the sequence assignment for a time slot. Note that in FIG. 5 tones assigned to a first user are shown in solid outline and denoted $m_1$, while tones assigned to a second user are shown in dashed outline and denoted $m_2$. A number of the tones assigned to the first user are identified, namely, $f_k^{s_i}$, $f_{k+1}^{s_i}$, and $f_{k+2}^{s_i}$. FIG. 6 shows the sequence $S_i =, f_0^{s'}, f_1^{s'}, \ldots, f_n^{s'}, \ldots$, and the sequence of tones assigned to a first user time slot, namely, $f_k^{s'}, \ldots f_{k+d-1}^{s'}$, where i=1, . . . $m_1$.

Figure 7:
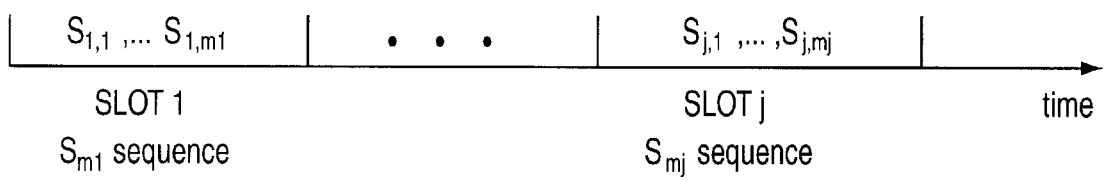
FIG. 7 graphically illustrates the sequence assignments for a plurality of time slots.

FIG. 7 graphically illustrates the sequence assignments for a plurality of time slots. A sequence assignment in the $j^{th}$ time slot is $\Phi_j = \{s_{j,1}, s_{j,2}, \ldots s_{j,m_j}\}$, where $m_j$ sequences are assigned as shown in FIG. 7. Indeed, sequences are assigned such that $\Phi_j = \arg \max \Phi_j \cap [\cup \Phi_{j-1}]$. Specifically, shown in FIG. 7 are the $S_{m1} = s_{i,1}, \ldots s_{1,m_1}$ sequence for time slot 1 and the $S_{mj} = s_{j,1}, \ldots s_{j,m_j}$ sequence for time slot j. The current sequence assignment is such as to maximally overlap with prior sequence assignments. This arrangement facilitates good interference and frequency diversity for the one or more users. When there are multiple users who need to be assigned the same set of sequences to facilitate the maximal overlap condition, other criteria must be incorporated such as the distance of the users from the base station to serve as a tie breaker. The users further away from the current base station being given preference in the assignment with the view that they are more likely to cause more interference to signals in the neighboring base stations than users close to the current base station.

The sequence assignment output from sequence assignor 302 is supplied as another input to user tone assignor 303.

User tone assignor 303 is responsive to the supplied outputs from sequence generator 301 and sequence assignor 302 to generate the sequence of tones for the particular user, namely, tones $\{f_1, \ldots f_i, \ldots f_m\}$. Tones $\{f_1, \ldots f_i, \ldots f_m\}$ are supplied to user bits to waveform mapper 304 where they are employed to modulate the users bits $b_i$ to generate an output waveform, namely, $\Sigma c_i e^{j2\pi f_i t}$. Note that $c_i$ may result from, for example, error correction encoding or bit modulation of user bits $b_i$. Such encoders and modulators are well known in the art and are considered a part of user bits to waveform mapper 304.

Waveform $\Sigma c_i e^{j2\pi f_i t}$ is supplied to antenna 306 for transmission as desired.

Figure 8:
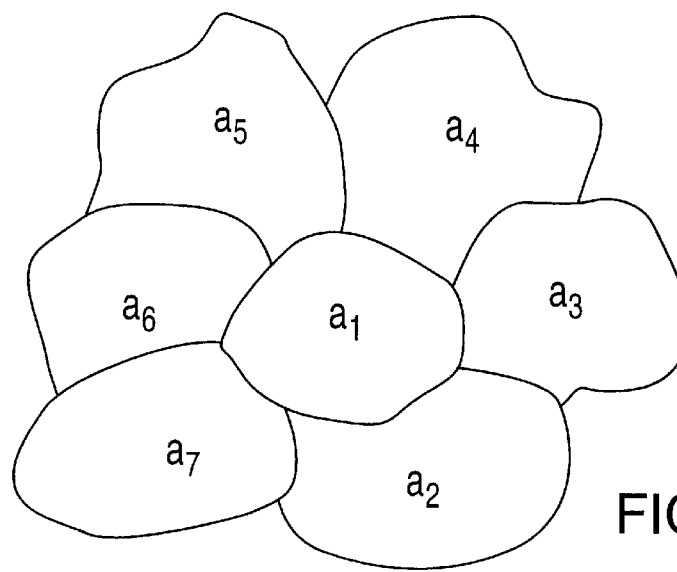
FIG. 8 illustrates a multicell environment in which the invention may advantageously employed.

FIG. 8 illustrates frequency hopping in a multicell environment in which an embodiment of the invention is advantageously employed. Note that each cell is assigned a different constant "a", where constant a defines a family of sequences and is employed in the generation of the particular family of sequences, as described above for the Latin Square, Latin Cube and Latin Hypercube sequences.

Figure 4:
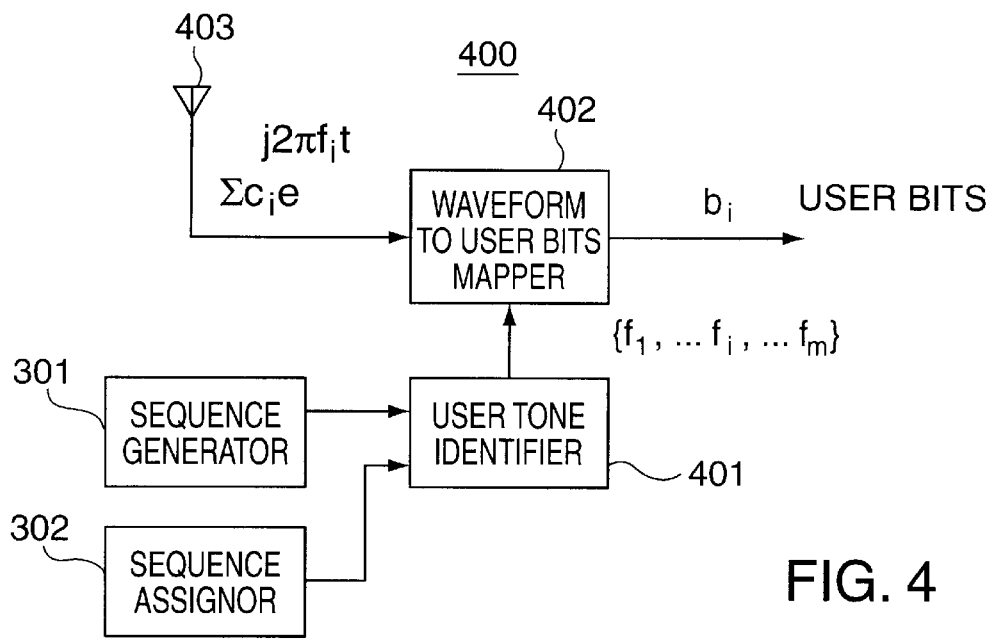
FIG. 4 shows, in simplified block diagram form, details of a receiver including an embodiment of the invention.

FIG. 4 shows, in simplified block diagram form, details of a receiver 400 including an embodiment of the invention. Elements of receiver 400 that are essentially identical in construction and functionality to those elements shown in FIG. 3, and described above, will not be described again in detail. Accordingly, user tone identifier 401 is responsive to the supplied outputs from sequence generator 301 and sequence assignor 302, as described above, to generate the sequence of tones for the particular user, namely, tones $\{f_1, \ldots f_i, \ldots f_m\}$. Tones $\{f_1, \ldots f_i, \ldots f_m\}$ are supplied to waveform to user bits mapper 402, where they are employed to demodulate the waveform received via antenna 403, namely, $\Sigma c_i e^{j2\pi f_i t}$, in order to obtain user bits $b_i$. Then, user bits $b_i$ are supplied as an output to be used as desired. Note that $c_i$ may result from, for example, error correction encoding or bit modulation of user bits $b_i$ in a remote transmitter. Therefore, $c_i$ must be accordingly decoded using an error correction decoder or demodulated using a bit demodulator. Again, such decoders and demodulators are well known in the art and are considered a part of waveform to user bits mapper 402.

Note that transmitter 300 and receiver 400 form a transceiver for use in a frequency hopping OFDM multiple access wireless system, either in mobile units or at base stations.

Figure 9:
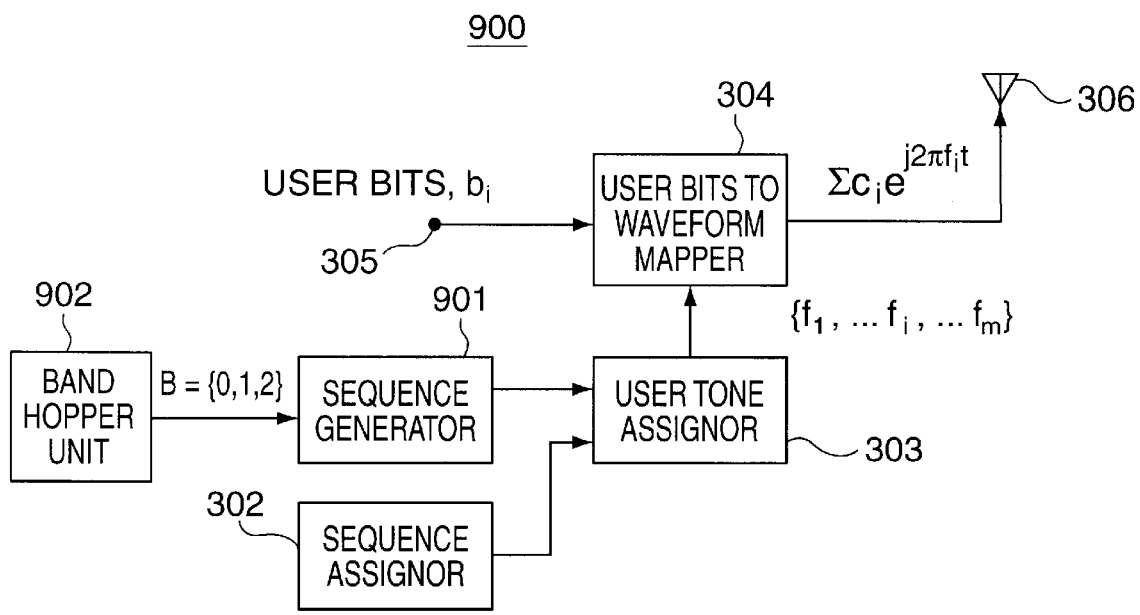
FIG. 9 shows, in simplified block diagram form, details of a transmitter advantageously employing an embodiment of the invention in a band hopping application.
Figure 11:
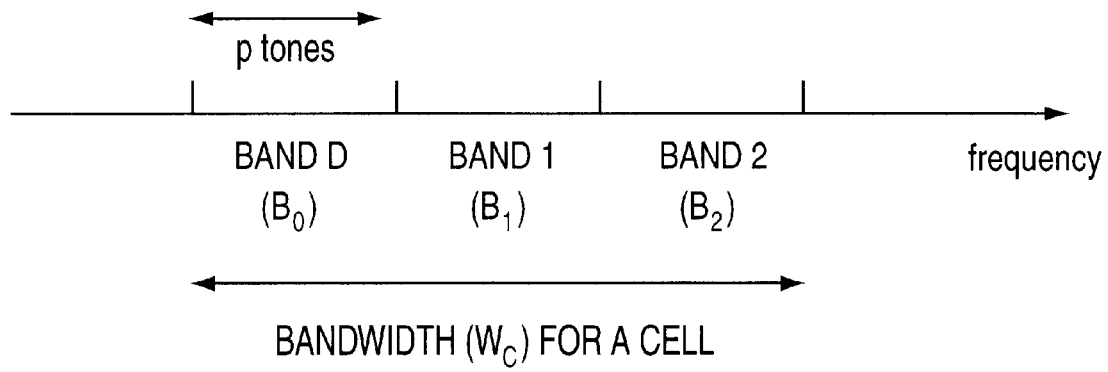
FIG. 11 illustrates a plurality of frequency bands each including a plurality of tones.

FIG. 9 shows, in simplified block diagram form, details of transmitter 900 that may advantageously employ an embodiment of the invention in a band hopping application. Again, the elements of transmitter 900 which are essentially identical in construction and functionality as those shown in FIG. 3 for transmitter 300 have been similarly numbered and will not be described again in detail. The only differences between transmitter 300 and 900 are in use of band hopper 902 to drive sequence generator 901 through, in this example, frequency bands $B_0$, $B_1$ and $B_2$, namely, $B\{0,1,2\}$, as shown in FIG. 11, and the sequence generation processes. Also shown in FIG. 11 is that each band includes p tones and that the bandwidth for a cell is $W_C$. In this example, sequence generator 901 generates the tone sequence in accordance with one of several processes.

Sequence generator 301 generates the frequency hopping sequences. Specifically, the sequence $S_i = \{f_0^{s_i}, f_1^{s_i}, \ldots f_k^{s_i}, \ldots\}$ is generated, in this example, in accordance with one of several processes.

A Latin Square sequence is generated by $f_k^{s_i} = (ak + s_i) \mod p + Bp$, where p, a and $s_i$ are integers, p is a prime number or a power of a prime number, B is the frequency band, k is a dwell time interval index, and the periodicity of the Latin Square sequence is p.

A Latin Cube sequence is generated by $$f_k^{s_i} = \left(a^2 \left\lfloor \frac{k}{p} \right\rfloor + ak + s_i\right) \mod p + Bp,$$

where p, a and $s_i$ are integers, p is a prime number or a power of a prime number, B is the frequency band, $$\left\lfloor \frac{k}{p} \right\rfloor$$

is the largest integer less than $$\frac{k}{p},$$

k is a dwell time interval index, and the periodicity of the Latin Cube sequence is $p^2$.

A Latin Hypercube, for example, of dimension L, is generated by $$f_k^{s_i} = \left(\sum_{l=1}^{L-1} a^l \left\lfloor \frac{k}{p^{l-1}} \right\rfloor + s_i\right) \mod p + Bp,$$

where p, a and $s_i$ are integers, p is a prime number or a power of a prime number, B is the frequency band, $$\left\lfloor \frac{k}{p^{l-1}} \right\rfloor$$

is the largest integer less than $$\frac{k}{p^{l-1}},$$

k is a dwell time interval index, and the periodicity of the Latin Hypercube sequence is $p^{i-1}$.

Figure 10:
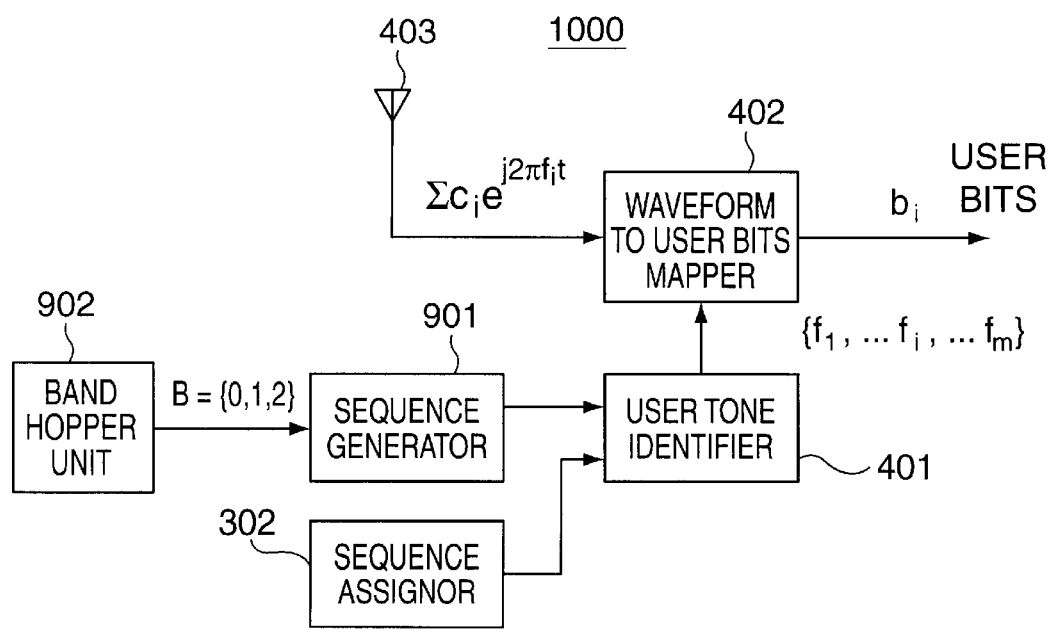
FIG. 10 shows, in simplified block diagram form, details of a receiver advantageously employing an embodiment of the invention in a band hopping application.

FIG. 10 shows, in simplified block diagram form, details of receiver 1000 that may advantageously employ an embodiment of the invention in a band hopping application. Again, the elements of receiver 1000 which are essentially identical in construction and functionality as those shown in FIG. 4 for receiver 400 have been similarly numbered and will not be described again in detail. The only differences between receivers 400 and 1000 are in use of band hopper 902 to drive sequence generator 901 through, in this example, frequency bands $B_0$, $B_1$ and $B_2$, namely, $B\{0,1,2\}$, as shown in FIG. 11, and the sequence generation processes. Band hopper 902 and sequence generator 901 are identical in construction and functionality as those shown in FIG. 9 and described above.

Figure 12:
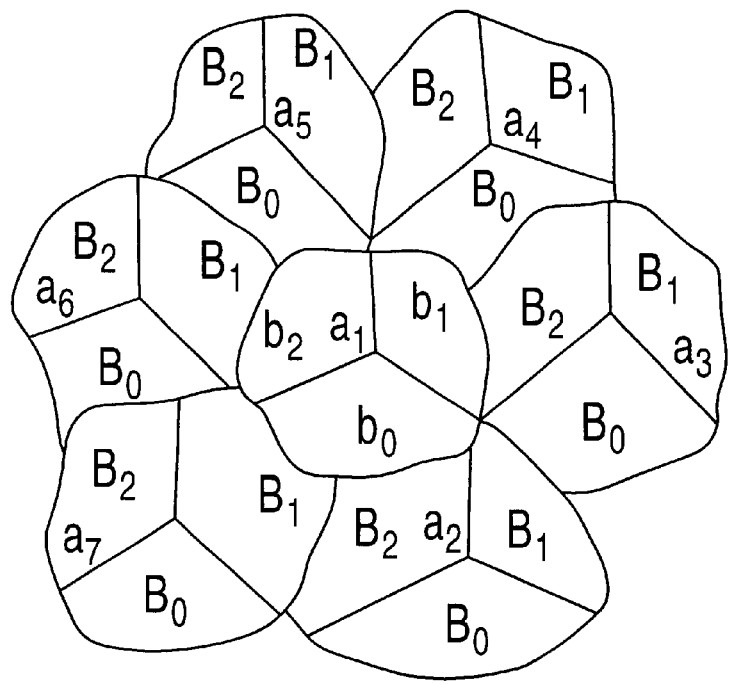
FIG. 12 illustrates an instant of a band hopping cellular system.

FIG. 12 illustrates an instant of a band hopping cellular system. By way of a simple example, consider a next instant of the band hopping cellular system in which the frequency bands in cell $a_1$ are such that frequency bands $B_0$, $B_1$ and $B_2$ become $B_1$, $B_2$ and $B_0$, respectively. Then, for example in cells $a_3$ $a_7$, the frequency bands rotate such that frequency bands $B_0$, $B_1$ and $B_2$ become $B_1$, $B_2$ and $B_0$, respectively. Consequently, there is no collision of frequency bands in the cell neighborhood.

Again, note that transmitter 900 and receiver 1000 form a transceiver for use in a band hopping OFDM multiple access wireless system, either in mobile units or in base stations.

The above-described embodiments are, of course, merely illustrative of the principles of the invention. Indeed, numerous other methods or apparatus may be devised by those skilled in the art without departing from the spirit and scope of the invention.

What is claimed is:

1. Apparatus for use in an orthogonal frequency division multiplexing (OFDM) based spread spectrum multiple access wireless system comprising:
   a sequence generator for generating one or more sequences; and
   a sequence assignor for assigning one or more of said one or more sequences on a time slot to time slot basis,
   wherein said one or more sequences are assigned for the duration of a time slot,
   wherein each time slot includes a prescribed number of dwell time intervals with each dwell time interval having a prescribed duration and each dwell time interval includes prescribed one or more tones.

2. Apparatus for use in an orthogonal frequency division multiplexing (OFDM) based spread spectrum multiple access wireless system comprising:
   a sequence generator for generating one or more sequences;
   a sequence assignor for assigning one or more of said one or more sequences on a time slot to time slot basis; and
   a a tone assignor responsive to said generated one or more sequences and to said assignment of said one or more of said sequences for assigning one or more tone sequences to a user on said time slot to time slot basis.

3. The invention as defined in claim 2 wherein said apparatus is for use in an OFDM transmitter.

4. The invention as defined in claim 2 wherein said sequence generator generates Latin square based sequences.

5. The invention as defined in claim 4 wherein said generated sequences are of the form $S_i = \{f_0^{s_i}, f_1^{s_i}, \ldots f_k^{s_i}, \ldots\}$ and said Latin square based sequences are generated in accordance with $f_k^{s_i} = (ak+s_i) \mod p$, where p, a and $s_i$ are integers, p is a prime number or a power of a prime number, k is a dwell time interval index, and the periodicity of the Latin Square sequence is p.

6. The invention as defined in claim 2 wherein said sequence generator generates Latin cube based sequences.

7. The invention as defined in claim 6 wherein said generated sequences are of the form $S_i = \{f_0^{s_i}, f_1^{s_i}, \ldots f_k^{s_i}, \ldots\}$ and said Latin cube sequence is generated by $$f_k^{s_i} = \left(a^2 \left\lfloor \frac{k}{p} \right\rfloor + ak + s_i\right) \mod p,$$

where p, a and $s_i$ are integers, p is a prime number or a power of a prime number, $$\left\lfloor \frac{k}{p} \right\rfloor$$

is the largest integer less than $$\frac{k}{p},$$

k is a dwell time interval index, and the periodicity of the Latin Cube sequence is $p^2$.

8. The invention as defined in claim 2 wherein said sequence generator generates Latin hypercube based sequences.

9. The invention as defined in claim 8 wherein said generated sequences are of the form $S_i = \{f_0^{s_i}, f_1^{s_i}, \ldots f_k^{s_i}, \ldots\}$ and said Latin hypercube sequence is generated by $$f_k^{s_i} = \left(\sum_{l=1}^{L-1} a^l \left\lfloor \frac{k}{p^{l-1}} \right\rfloor + s_i\right) \mod p,$$

where p, a and $s_i$ are integers, p is a prime number or a power of a prime number, $$\left\lfloor \frac{k}{p^{l-1}} \right\rfloor$$

is the largest integer less than $$\frac{k}{p^{l-1}},$$

k is a dwell time interval index, and the periodicity of the Latin a Hypercube sequence is $p^{i-1}$.

10. Apparatus for use in an orthogonal frequency division multiplexing (OFDM) based spread spectrum multiple access wireless system comprising:
    a sequence generator for generating one or more sequences;
    a sequence assignor for assigning one or more of said one or more sequences on a time slot to time slot basis; and
    a a tone identifier responsive to said generated one or more sequences and to said assignment of said one or more of said sequences for identifying incoming tone sequences to a user on said time slot to time slot basis.

11. The invention as defined in claim 10 wherein said apparatus is for use in an OFDM receiver.

12. The invention as defined in claim 10 wherein said sequence generator generates Latin square based sequences.

13. The invention as defined in claim 12 wherein said generated sequences are of the form $S_i = \{f_0^{s_i}, f_1^{s_i}, \ldots f_k^{s_i}, \ldots\}$ and said Latin square based sequences are generated in accordance with $f_k^{s_i} = (ak+s_i) \mod p$, where p, a and $s_i$ are integers, p is a prime number or a power of a prime number, k is a dwell time interval index, and the periodicity of the Latin Square sequence is p.

14. The invention as defined in claim 10 wherein said sequence generator generates Latin cube based sequences.

15. The invention as defined in claim 14 wherein said generated sequences are of the form $S_i = \{f_0^{s_i}, f_1^{s_i}, \ldots f_k^{s_i}, \ldots\}$ and said Latin cube sequence is generated by $$f_k^{s_i} = \left(a^2 \left\lfloor \frac{k}{p} \right\rfloor + ak + s_i\right) \mod p,$$

where p, a and $s_i$ are integers, p is a prime number or a power of a prime number, $$\left\lfloor \frac{k}{p} \right\rfloor$$

is the largest integer less than $$\frac{k}{p},$$

k is a dwell time interval index, and the periodicity of the Latin Cube sequence is $p^2$.

16. The invention as defined in claim 10 wherein said sequence generator generates Latin hypercube based sequences.

17. The invention as defined in claim 16 wherein said generated sequences are of the form $S_i=\{f_0^{s_i}, f_1^{s_i}, \ldots f_k^{s_i}, \ldots\}$ and said Latin hypercube sequence is generated by $$f_k^{s_i} = \left(\sum_{l=1}^{L-1} a^l \left\lfloor \frac{k}{p^{l-1}} \right\rfloor + s_i \right) \bmod p,$$

where p, a and $s_i$ are integers, p is a prime number or a power of a prime number, $$\left\lfloor \frac{k}{p^{l-1}} \right\rfloor$$

is the largest integer less than $$\frac{k}{p^{l-1}},$$

k is a dwell time interval index, and the periodicity of the Latin Hypercube sequence is $p^2$.

18. Apparatus for use in an orthogonal frequency division multiplexing (OFDM) based spread spectrum multiple access wireless system comprising:
   a sequence generator for generating one or more sequences;
   a sequence assignor for assigning one or more of said one or more sequences on a time slot to time slot basis; and
   a band hopper unit for generating a plurality of frequency bands and for supplying said frequency bands in a sequence as an output, and wherein said sequence generator is responsive to said sequence of said plurality of frequency bands output to generate said one or more sequences in a supplied frequency band.

19. The invention as defined in claim 18 further including a tone assignor responsive to said generated one or more sequences and to said assignment of said prescribed one or more of said sequences for assigning one or more tone sequences to a user on said time slot to time slot basis.

20. The invention as defined in claim 19 wherein said apparatus is for use is for use in an OFDM transmitter.

21. The invention as defined in claim 19 wherein said sequence generator generates Latin square based sequences.

22. The invention as defined in claim 21 wherein said generated sequences are of the form $S_i=\{f_0^{s_i}, f_1^{s_i}, \ldots f_k^{s_i}, \ldots\}$ and said Latin square based sequences are generated in accordance with $f_k^{s_i}=(ak+s_i) \bmod p+Bp$, where p, a and $s_i$ are integers, p is a prime number or a power of a prime number, B is the frequency band, k is a dwell time interval index, and the periodicity of the Latin Square sequence is p.

23. The invention as defined in claim 19 wherein said sequence generator generates Latin cube based sequences.

24. The invention as defined in claim 23 wherein said generated sequences are of the form $S_i=\{f_0^{s_i}, f_1^{s_i}, \ldots f_k^{s_i}, \ldots\}$ and said Latin cube sequence is generated by $$f_k^{s_i} = \left(a^2 \left\lfloor \frac{k}{p} \right\rfloor + ak + s_i \right) \bmod p + Bp,$$

where p, a and $s_i$ are integers, p is a prime number or a power of a prime number, B is the frequency band, $$\left\lfloor \frac{k}{p} \right\rfloor$$

is the largest integer less than, $$\frac{k}{p},$$

k is a dwell time interval index, and the periodicity of the Latin Cube sequence is $p^2$.

25. The invention as defined in claim 19 wherein said sequence generator generates Latin hypercube based sequences.

26. The invention as defined in claim 25 wherein said generated sequences are of the form $S_i=\{f_0^{s_i}, f_1^{s_i}, \ldots f_k^{s_i}, \ldots\}$ and said Latin hypercube sequence is generated by $$f_k^{s_i} = \left(\sum_{l=1}^{L-1} a^l \left\lfloor \frac{k}{p^{l-1}} \right\rfloor + s_i \right) \bmod p + Bp,$$

where p, a and $s_i$ are integers, p is a prime number or a power of a prime number, B is the frequency band, $$\left\lfloor \frac{k}{p^{l-1}} \right\rfloor$$

is the largest integer less than $$\frac{k}{p^{l-1}},$$

k is a dwell time interval index, and the periodicity of the Latin Hypercube sequence is $p^{i-1}$.

27. The invention as defined in claim 18 further including a tone identifier responsive to said generated one or more sequences and to said assignment of said prescribed plurality of said sequences for identifying incoming tone sequences to a user on said time slot to time slot basis.

28. The invention as defined in claim 27 wherein said apparatus is for use in an OFDM receiver.

29. The invention as defined in claim 27 wherein said sequence generator generates Latin square based sequences.

30. The invention as defined in claim 29 wherein said generated sequences are of the form $S_i=\{f_0^{s_i}, f_1^{s_i}, \ldots f_k^{s_i}, \ldots\}$ and said Latin square based sequences are generated in accordance with $$f_k^{s_i} = \left(a^2 \left\lfloor \frac{k}{p} \right\rfloor + ak + s_i \right) \bmod p + Bp,$$

where p, a and $s_i$ are integers, p is a prime number or a power of a prime number, B is the frequency band, k is a dwell time interval index, and the periodicity of the Latin SquaW sequence is p.

31. The invention as defined in claim 27 wherein said sequence generator generates Latin cube based sequences.

32. The invention as defined in claim 31 wherein said generated sequences are of the form $S_i = \{f_0^{s_i}, f_1^{s_i}, \ldots f_k^{s_i}, \ldots\}$ and said Latin cube sequence is generated by $$f_k^{s_i} = \left(a^2 \left\lfloor \frac{k}{p} \right\rfloor + ak + s_i\right) \bmod p + Bp,$$

where p, a and $s_i$ are integers, p is a prime number or a power of a prime number, B is the frequency band, $$\left\lfloor \frac{k}{p} \right\rfloor$$

is the largest integer less than $$\frac{k}{p},$$

k is a dwell time interval index, and the periodicity of the Latin Cube sequence is $p^2$.

33. The invention as defined in claim 27 wherein said sequence generator generates Latin hypercube based sequences.

34. The invention as defined in claim 33 wherein said generated sequences are of the form $S_i = \{f_0^{s_i}, f_1^{s_i}, \ldots f_k^{s_i}, \ldots\}$ and said Latin hypercube sequence is generated by $$f_k^{s_i} = \left(\sum_{l=1}^{L-1} a^l \left\lfloor \frac{k}{p^{l-1}} \right\rfloor + s_i\right) \bmod p + Bp,$$

where p, a and $s_i$ are integers, p is a prime number or a power of a prime number, B is the frequency band, $$\left\lfloor \frac{k}{p^{l-1}} \right\rfloor$$

is the largest integer less than $$\frac{k}{p^{l-1}},$$

k is a dwell time interval index, and the periodicity of the Latin Hypercube sequence is $p^{i-1}$.

35. A transceiver for use in an orthogonal frequency division multiplexing (OFDM) based spread spectrum multiple access wireless system comprising:
   a transmitter including
      a first sequence generator for generating one or more sequences,
      a first sequence assignor for assigning prescribed one or more of said one or more sequences generated by said first sequence generator on a time slot to time slot basis, wherein assignment is effected of a prescribed one or more of said sequences in a time slot, and
      a tone assignor responsive to said one or more sequences generated by said first sequence and to said assignment of said prescribed one or more of said sequences assigned by said first sequence assignor for assigning one or more tone sequences to a user on said time slot to time slot basis; and
   a receiver including
      a second sequence generator for generating one or more sequences,
      a second sequence assignor for assigning prescribed one or more of said one or more sequences generated by said second sequence generator on a time slot to time slot basis, wherein assignment is effected of a prescribed one or more of said sequences in a time slot, and
      a tone identifier responsive to said one or more of sequences generated by said second sequence generator and to said assignment of said prescribed one or more of said sequences assigned by said second sequence assignor for identifying incoming tone sequences to a user on said time slot to time slot basis.

36. The invention as defined in claim 35 wherein said prescribed one or more sequences are assigned by said first and second sequence assignors in such a manner that they maximally overlap prior assigned sequences.

37. The invention as defined in claim 35 wherein said one or more sequences are assigned by said first and second sequence assignors for the duration of a time slot.

38. The invention as defined in claim 37 wherein each time slot includes a prescribed number of dwell time intervals with each dwell time interval having a prescribed duration and each dwell time interval includes prescribed one or more tones.

39. The invention as defined in claim 35 wherein each of said first and second sequence generators generates Latin square based sequences.

40. The invention as defined in claim 39 wherein said generated sequences are of the form $S_i = \{f_0^{s_i}, f_1^{s_i}, \ldots f_k^{s_i}, \ldots\}$ and said Latin square based sequences are generated in accordance with $$f_k^{s_i} = \left(a^2 \left\lfloor \frac{k}{p} \right\rfloor + ak + s_i\right) \bmod p + Bp,$$

where p, a and $s_i$ are integers, p is a prime number or a power of a prime number, B is the frequency band, k is a dwell time interval index, and the periodicity of the Latin Square sequence is p.

41. The invention as defined in claim 35 wherein each of said first and second sequence generators generates Latin cube based sequences.

42. The invention as defined in claim 41 wherein said generated sequences are of the form $S_i = \{f_0^{s_i}, f_1^{s_i}, \ldots f_k^{s_i}, \ldots\}$ and said Latin cube sequence is generated by $$f_k^{s_i} = \left(a^2 \left\lfloor \frac{k}{p} \right\rfloor + ak + s_i\right) \bmod p,$$

where p, a and $s_i$ are integers, p is a prime number or a power of a prime number $$\left\lfloor \frac{k}{p} \right\rfloor$$

is the largest integer less than $$\frac{k}{p},$$

k is a dwell time interval index, and the periodicity of the Latin Cube sequence is $p^2$.

43. The invention as defined in claim 35 wherein each of said first and second sequence generators generates Latin hypercube based sequences.

44. The invention as defined in claim 43 wherein said generated sequences are of the form $S_i = \{f_0^{s_i}, f_1^{s_i}, \ldots f_k^{s_i}, \ldots\}$ and said Latin hypercube sequence is generated by $$f_k^{s_i} = \left(\sum_{l=1}^{L-1} a^l \left\lfloor \frac{k}{p^{l-1}} \right\rfloor + s_i \right) \bmod p,$$

where where p, a and $s_i$ are integers, p is a prime number or a power of a prime number $$\left\lfloor \frac{k}{p^{l-1}} \right\rfloor$$

is the largest integer less than $$\frac{k}{p^{l-1}},$$

k is a dwell time interval index, and the periodicity of the Latin Hypercube sequence is $p^{i-1}$.

* * * * *